US 12,547,604 B2

(12) United States Patent
Islamov et al.

(10) Patent No.: US 12,547,604 B2
(45) Date of Patent: Feb. 10, 2026

(54) COMPUTER SYSTEM AND METHOD FOR RECONCILING DATA

(71) Applicant: The Toronto-Dominion Bank, Toronto (CA)

(72) Inventors: Nikita Islamov, Toronto (CA); Noura Nimri, Mississauga (CA); Morgan Aguiar, Toronto (CA); Suk Ching Steven Chiu, Markham (CA); Adrian Ariel Ionescu, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/613,438

(22) Filed: Mar. 22, 2024

(65) Prior Publication Data

US 2025/0298788 A1    Sep. 25, 2025

(51) Int. Cl.
*G06F 16/23*    (2019.01)
(52) U.S. Cl.
CPC .................. *G06F 16/2365* (2019.01)
(58) Field of Classification Search
CPC .... G06F 16/2365; G06F 16/23; G06F 16/235; G06F 16/27; G06F 16/184
See application file for complete search history.

(56) References Cited

U.S. PATENT DOCUMENTS

| | | |
|---|---|---|
| 8,838,535 B2 | 9/2014 | Hu et al. |
| 9,098,565 B1 * | 8/2015 | Kumarjiguda ........ G06F 16/288 |
| 9,336,536 B1 | 5/2016 | Ilghar et al. |
| 10,681,083 B2 | 6/2020 | Xie |
| 10,726,029 B2 | 7/2020 | Choudhary et al. |
| 11,030,204 B2 | 6/2021 | Oks et al. |
| 2013/0238351 A1 * | 9/2013 | Burns .................... G16H 10/20 705/2 |
| 2019/0364109 A1 | 11/2019 | Oks et al. |
| 2020/0073995 A1 * | 3/2020 | Martin ................... G16H 70/40 |
| 2021/0382995 A1 * | 12/2021 | Massiglia ............. G06F 3/0659 |
| 2022/0334725 A1 * | 10/2022 | Mertes ................... G06F 3/065 |
| 2023/0265750 A1 * | 8/2023 | Davies .................... E21B 49/00 166/250.01 |

FOREIGN PATENT DOCUMENTS

CN    116954863 A    10/2023

* cited by examiner

*Primary Examiner* — Mark E Hershley
*Assistant Examiner* — Dustin D Eyers
(74) *Attorney, Agent, or Firm* — CPST Intellectual Property Inc.; Brett J. Slaney; Amy Scouten

(57) ABSTRACT

A system and method are provided for reconciling data used by a data management system. In some examples, the data management system provides a workspace for machine learning. The method includes obtaining an input dataset, the input dataset being replicated from a baseline dataset to enable the data management system to operate on the input dataset. The method also includes comparing the input dataset to the baseline data set to determine discrepancies between the input and baseline datasets, by, for each of a plurality of database pools, process data assigned to that pool by concurrently checking for the discrepancies and executing statements without waiting for all pools to have finished processing. The method also includes creating a delta table for each pool to identify extracted data associated with the discrepancies; and combining delta pools from the plurality of database pools and process columns in the delta table.

20 Claims, 13 Drawing Sheets

COMPUTER SYSTEM AND METHOD FOR RECONCILING DATA

TECHNICAL FIELD

The following generally relates to reconciling data, for example, to reconciling enterprise data used in performing analytics or development.

BACKGROUND

Enterprises often manage large quantities of data, both internally for operational purposes and to store and provide data and services to client devices such as users of an application hosted by the enterprise. These enterprises may also utilize internally stored data to perform analytics and/or to develop and improve applications. This may involve having multiple sets of data that continually updates over time, often on a daily or multi-daily basis.

Reconciling such data can be time consuming, resource intensive, and difficult to manage, particularly if an enterprise wants to pre-emptively catch errors before errors, complaints, and other issues arise.

In addition to computing resources, reconciliation tasks may require manual processes or otherwise lack automation to ensure smooth data management operations. For example, data stewards and other administrators of data face many repetitive tasks that can be time consuming and are prone to errors, particularly when repeated.

BRIEF DESCRIPTION OF THE DRAWINGS

Embodiments will now be described with reference to the appended drawings wherein.

DETAILED DESCRIPTION

Figure 1:
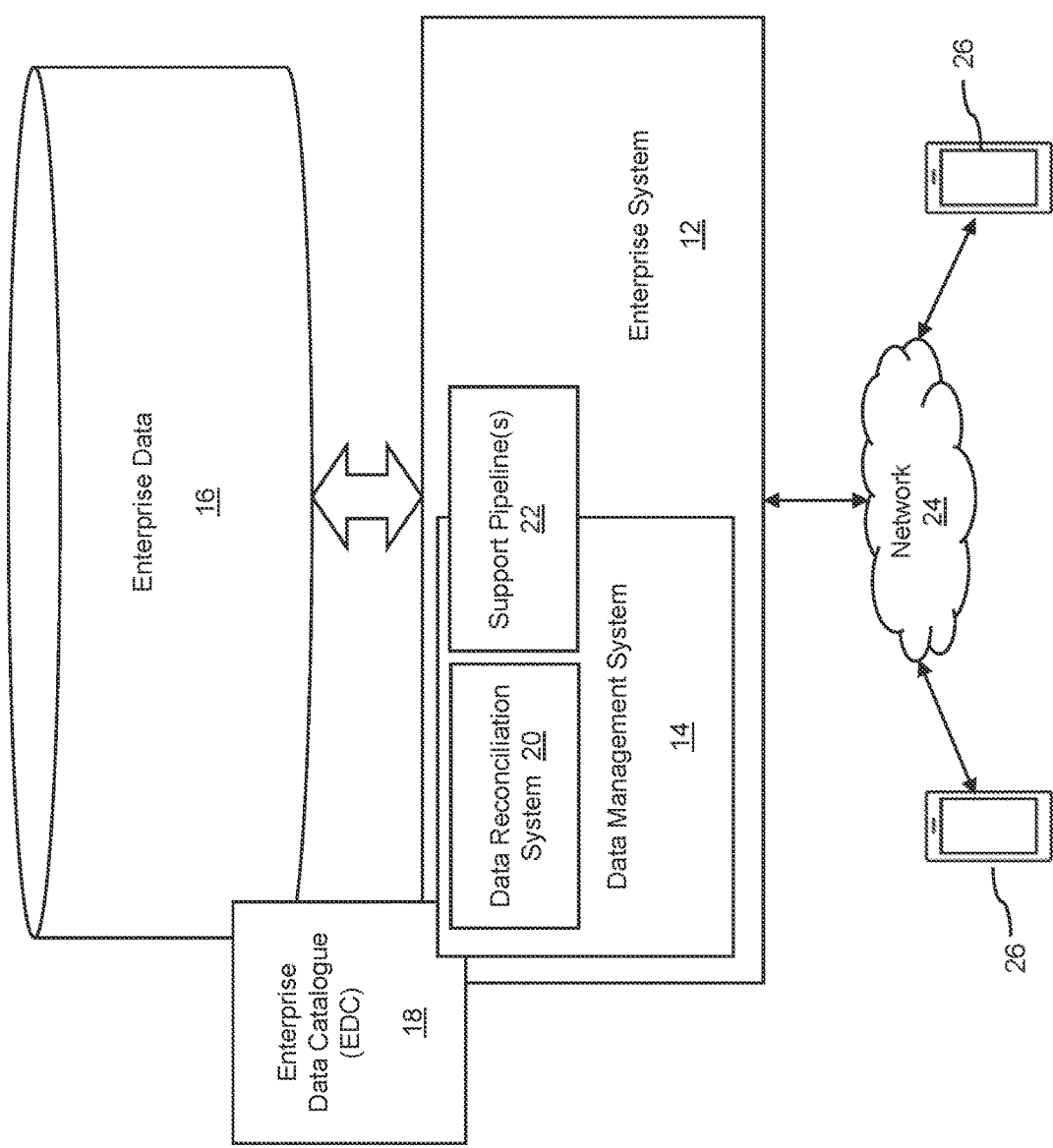
FIG. 1 is a schematic diagram of an example computing environment.

The following describes a process for reconciling data based on snapshots of data relative to a baseline. An automated snapshot reconciliation is enabled, which also includes multi-threading and logging enhancements. The reconciliation process includes a database or data set "hardening", where process and execute notebooks are merged into one and implemented in parallel execution pools. Each pool may process individually and concurrently with other pools. For example, a first pool (pool_1) can go through enterprise data catalogue (EDC) processing/execution immediately or promptly after access management processing/execution. In such an example, a second pool (pool_2) may follow the same logic concurrently. The proposed solution also includes switching from a one ended data access control (DAC) only status-reliant approach, to daily "data management snapshot" reconciliations.

The data reconciliations can support both EDC workflows and access management input (AMI) workflows. The EDC workflow process may ingest data from the EDC and map the requirements based on a custom attribute, namely a default data treatment (DT) to drive the masking requirements on each respective database pool. Dynamic Data Masking (DDM) at the table level for redact/partial redact functions and can provide custom views with non-supported treatments for DDM like tokenization, rounding, generalization and trimming (partial dates).

The AMI workflow process controls the access requests that get submitted by business operations via a mailbox (e.g., Tibco™), which are ingested into the DAC database and provisions access to an analytic zone service principle. In the examples described herein, there are three types of access requests: elevated (clear), non-elevated (e.g., default data treatment in EDC), and revoke (denying access).

Both the EDC and AMI workflows can leverage the reconciliation process, which allows an enterprise to look at all historical requests to ensure if anything is out of sync across the consumption database pools on the enterprise's platform. This can greatly save the time to identify end user issues by automatically reconciling requests versus what has been provisioned on the data management system. As described herein, the reconciliation process pulls technical metadata defined by the framework to identify what matches and what is out of sync. Once the processes have completed identifying the out of sync entities and elements, the reconciliation process can bundle the net new requests with the historical out of sync requests to run and reconcile.

The new EDC logic may be configured to take records from EDC inputs and concurrently compare with each respective database (e.g., SQL) pool to check for discrepancies between the data treatment in the input and what is applied on the database pools. If there is a discrepancy between the input and the pool, this means there has been a change, and the system is instructed to apply its masking/tokenization based on what is in the input table. Each pool may get split into a job cluster (separate compute) where parallel activities can run and complete independently from other database pool processes. As the system is processing bulk multi-thread processes across multiple pools, the logging processes may update all of the dependent reporting and audit tables during the time of execution.

Process and execute notebooks when combined into one, enables processing to happen concurrently on all pools and execution may occur immediately for each pool. This can make the process faster and more efficient as:

1) there is no need to wait for all processing for all pools to happen before execution (as one pool has no dependency on another); and
2) concurrent execution vs existing sequential execution means no need to wait for very slow pools-pools that have processed can execute immediately and complete.

The proposed logic can also be configured to remove cross checking with EDC lookup—that is, the logic may process what is NULL in the input. The logic may also concurrently check database (e.g., SQL) pools for discrepancies with the input table and concurrently execute statements for pools that have finished processing, without the need to wait for processing to finish. For example, the process may create delta tables to extract SQL pools into and statements may be created based on EDC input values.

Moreover, the process may pick up an entire table for reprocessing if any of its column statuses or new columns are added, to deal with tokenized columns. Other features may include, without limitation, creating columns in the EDC input for a role name, creating columns in the EDC input for comments. Also, lookup tables may no longer be truncated. Backups may occur, for example, once per week, and input table backups may also occur, for example, once per week.

In the above framework, the process may check with each data pool value that is NULL in EDC and take those records and process each database pool on its own thread to create and execute statements. For concurrent processing/execution, there is one thread per database pool and each thread may have its own delta table. At the end of processing in all pools, the delta tables are combined, and the process may update execution. For example, SQL pools may include temporary tables, which pull the latest SQL pool tables for each SQL pool and store in temporary tables. For multi-threading/multi-SQL pool execution, the process may execute multiple pools at once and eliminate waiting for certain lagging pools vs sequential execution.

The following also provides a support pipeline framework to support data stewardship by automating tasks. The support framework may automate repetitive tasks by creating pipelines that auto-generate database (e.g., SQL) queries.

The support framework in the proposed solution can reduce dependencies on database (DB) operations (Ops). The support pipelines may be created or developed to activate/inactivate records in the DAC database such as bad data. Other support pipelines may be developed and used to update data treatment status in the DAC database to force reprocessing of certain columns. All pipeline parameters may be passed with single quotes separated by commas for multiples, for example, with the exception of Data_treatment_status (pass as 0 or 1 or NULL with no quotes).

The support framework provides automated pipelines built on cloud-based data factories to accelerate support tasks which are repetitive for users of the DAC system. Some of the pipelines described herein include, without limitation:
1. Status Reset (force a previous status to null)→this will force a reprocessing request for a given table/view.
2. Set Active/Inactive→Process to activate or deactivate an element from being a part of the reconciliation process (i.e., bad data that continues to get reprocessed can be deactivated).
3. Data Catalog Look Back (Control Date)→allows framework to pull historical data from the EDC, any duplicate records will be deduplicated.
4. Drop and Recreate data management system user for analytic zone→assists with troubleshooting for logging in.
5. Add/Remove users from workload classifiers→Supports the workload groups and balances resources on the database pools.

In one aspect, there is provided a system for reconciling data used by a data management system. The system includes a processor, a data interface coupled to the processor, and a memory coupled to the processor and data interface, the memory storing computer-executable instructions that, when executed by the processor, cause the system to: obtain an input dataset, the input dataset being replicated from a baseline dataset to enable the data management system to operate on the input dataset; compare the input dataset to the baseline data set to determine discrepancies between the input and baseline datasets, by: for each of a plurality of database pools, process data assigned to that pool by concurrently checking for the discrepancies and executing statements without waiting for all pools to have finished processing; create a delta table for each pool to identify extracted data associated with the discrepancies; and combine delta pools from the plurality of database pools and process columns associated with the delta table.

In certain example embodiments, the computer-executable instructions that, when executed by the processor, further cause the system to: apply a data treatment process to at least one column in the delta table.

In certain example embodiments, the discrepancies are determined using metadata associated with at least one of the input dataset and the baseline dataset.

In certain example embodiments, wherein the computer-executable instructions, when executed by the processor, further cause the system to: filter the input dataset and the baseline dataset to determine an overlapping set of data to be reconciled.

In certain example embodiments, the pools are SQL pools.

In certain example embodiments, the baseline dataset comprises data from an enterprise data catalogue and the input dataset comprises data from the data management system that has been copied for processing independent of operations of an enterprise system.

In certain example embodiments, the data management system provides curated data to be used in an analytics zone, the curated data being generated by reconciling the input dataset with the baseline dataset.

In certain example embodiments, wherein the computer-executable instructions, when executed by the processor, further cause the system to: generate logging statements for each database pool; use temporary tables to store the logging statements; and combine the logging statements.

In certain example embodiments, wherein the computer-executable instructions, when executed by the processor, further cause the system to: automatically reconcile the input dataset with the baseline dataset on a periodic basis.

In certain example embodiments, wherein the baseline dataset comprises data from an access management input and the input dataset comprises data from the data management system that has been copied for processing independent of operations of an enterprise system.

In certain example embodiments, wherein the data treatment process comprises masking, tokenization or both masking and tokenization.

In another aspect, there is provided a method for reconciling data used by a data management system, the method comprising: obtaining an input dataset, the input dataset being replicated from a baseline dataset to enable the data management system to operate on the input dataset; comparing the input dataset to the baseline data set to determine discrepancies between the input and baseline datasets, by: for each of a plurality of database pools, process data assigned to that pool by concurrently checking for the discrepancies and executing statements without waiting for all pools to have finished processing; creating a delta table for each pool to identify extracted data associated with the discrepancies; and combining delta pools from the plurality of database pools and process columns associated with the delta table.

In certain example embodiments, the method further comprises applying a data treatment process to at least one column in the delta table.

In certain example embodiments, the discrepancies are determined using metadata associated with at least one of the input dataset and the baseline dataset.

In certain example embodiments, the method further comprises filtering the input dataset and the baseline dataset to determine an overlapping set of data to be reconciled.

In certain example embodiments, the baseline dataset comprises data from an enterprise data catalogue and the input dataset comprises data from the data management system that has been copied for processing independent of operations of an enterprise system.

In certain example embodiments, the data management system provides curated data to be used in an analytics zone, the curated data being generated by reconciling the input dataset with the baseline dataset.

In certain example embodiments, the method further includes generating logging statements for each database pool; using temporary tables to store the logging statements; and combining the logging statements.

In certain example embodiments, the baseline dataset comprises data from an access management input and the input dataset comprises data from the data management system that has been copied for processing independent of operations of an enterprise system.

In another aspect, there is provided a computer readable medium comprising computer-executable instructions for reconciling data used by a data management system. The computer readable medium being executed by a processor of a computer system comprising a data interface, comprising instructions for: obtaining an input dataset, the input dataset being replicated from a baseline dataset to enable the data management system to operate on the input dataset; comparing the input dataset to the baseline data set to determine discrepancies between the input and baseline datasets, by: for each of a plurality of database pools, process data assigned to that pool by concurrently checking for the discrepancies and executing statements without waiting for all pools to have finished processing; creating a delta table for each pool to identify extracted data associated with the discrepancies; and combining delta pools from the plurality of database pools and process columns associated with the delta table.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

Referring now to the figures, FIG. 1 illustrates an exemplary computing environment 10 in which the elements of the disclosed system(s) may operate. The computing environment 10 can include one or more user devices 26, a communications network 24 connecting one or more components of the computing environment 10, for example an enterprise system 12, a data management system 14 (e.g., MS Synapse™), one or more databases referred to herein as enterprise data 16, and an enterprise data catalogue (EDC) 18. The data management system 14 includes a data reconciliation system 20, which may be used to reconcile data it uses for data management operations such as permitted data analytics of copies of enterprise data 16, with the actual enterprise data 16. As illustrated using a partial overlap in FIG. 1, the enterprise system 12 and/or data management system 14 may be coupled directly or indirectly to a framework providing one or more support pipelines 22 to support data stewardship by automating tasks. It can be appreciated that the data management system 14 may be a component or portion of the enterprise system 12 as shown in FIG. 1, but it can be appreciated that the data management system 14 may, alternatively, be a separate service or platform coupled thereto. Similarly, which the EDC 18 is shown as spanning and overlapping the enterprise data 16 and the enterprise system 12, it can be appreciated that the EDC 18 may be a component wholly hosted by the enterprise system 12 (or data management system 14) or may be a separate entity coupled thereto.

The enterprise system 12 (e.g., a financial institution such as commercial bank and/or lender) can be a system that provides a plurality of services via a plurality of enterprise resources (e.g., database resources, computing resources, both internally to enterprise users and externally to enterprise clients). The enterprise services can be provided by dedicated computing resources (e.g., via dedicated hardware), or through resources shared amongst the enterprise system 12. The enterprise resources can be provided by the enterprise system 12, or by a third party contracted by the enterprise system 12 (e.g., a cloud computing provider), etc. In an example embodiment, the enterprise system 12 is a system that includes sensitive computing resources, such as records of financial services or user accounts or transactions associated with those financial service accounts. While several details of the enterprise system 12 have been omitted for clarity of illustration, reference will be made to FIG. 10 below for additional details. As indicated above, the data management system 14 can be hosted and provided within the enterprise system 12 as additionally illustrated in FIG. 10.

User devices 26 may be associated with one or more users which can have authenticated access to the enterprise resources or other parts of the enterprise system 12. Users may be customers, employees, contractors, administrators, data stewards, developers, testers, regulators, or other entities that interact with the enterprise system 12 and/or data management system 14 (directly or indirectly). The computing environment 10 may include multiple user devices 26, each user device 26 being associated with a separate user or associated with one or more users. The client devices can be external to the enterprise system 12 (e.g., as shown in FIG. 1) or internal to the enterprise system 12. In certain example embodiments, a user may operate user device 26 such that user device 26 performs one or more processes consistent with the disclosed embodiments. For example, the user may employ user device 26 to interact with a GUI to initiate and complete executable actions via the data management system 14, EDC 18, etc.

User devices 26 can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 24.

Communication network 24 may include a telephone network, cellular, and/or data communication network to connect different types of user devices 26 and systems (e.g., enterprise system 12 and data management system 14 which may utilize server computing devices). For example, the communication network 24 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

The data management system 14 and/or enterprise system 12 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the data management system 14 and enterprise system 12. The cryptographic server may, for example, be used to protect the financial data and/or client data and/or transaction data within the enterprise system 12 by way of encryption for data protection, digital signatures or message digests for data integrity, and by using digital certificates to authenticate the identity of the users and user devices 26 with which the enterprise system 12 and/or data management system 14 communicates to inhibit misuse. It can be appreciated that various cryptographic mechanisms and protocols can be chosen and implemented to suit the constraints and requirements of the particular deployment of the data management system 14 or enterprise system 12 as is known in the art.

Figure 2:
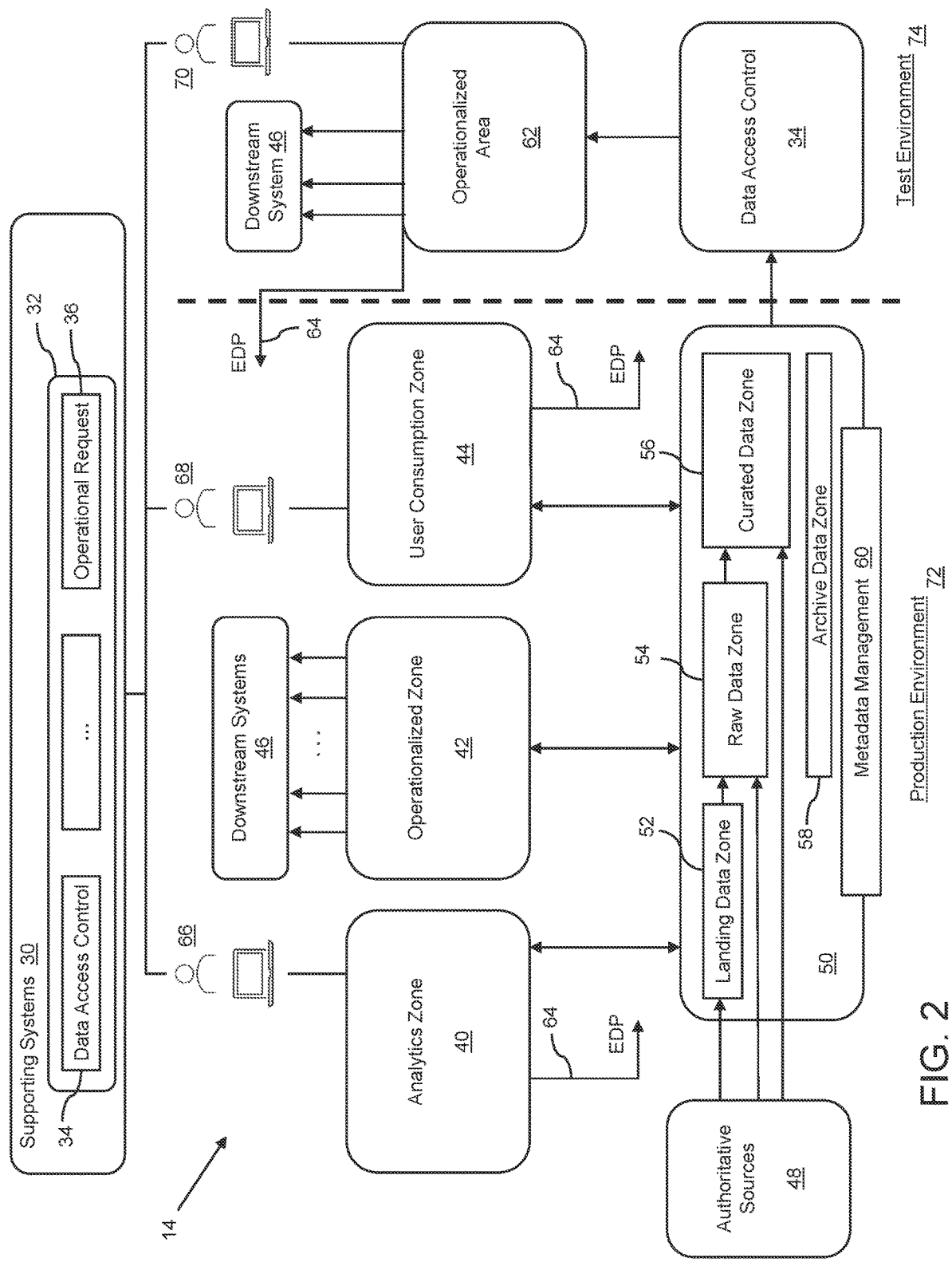
FIG. 2 is a schematic diagram of an example data access control configuration for an enterprise system.

Referring now to FIG. 2, a data access and analytics framework and implementation that may be used to configure the data management system 14 is shown. Certain example embodiments and illustrative examples described herein may apply to a Microsoft Azure™ Synapse-based data management system 14, it can be appreciated that the examples and principles discussed herein may equally apply to any data management system 14, such as those deployed within an enterprise system 12 for use with enterprise data 16, e.g., to provide a workspace for data preparation, data management, data exploration, enterprise data warehousing, big data, and artificial intelligence or machine learning or other advanced analytics.

In this example configuration, a number of supporting systems 30 are provided in connection with various user types. One example shown is a self-service support system 32 (e.g., for request and approval workflows). Other examples may include community or system/app monitoring or reporting workflows. The self-service support system 32 may include, as shown, a data access control (DAC) function or utility, hereinafter referred to as DAC 34. The support system 32 may also include other workflow utilities such as operational requests 36, or ad-hoc data input/output requests (not shown), etc. The supporting systems 32 may be coupled to various user types, such as developers 66, consumers 68, and testers 70. These user types may differ based on the environment in which they operate. For example, the developers 66 and consumers 68 may operate within a production environment 72 while testers 70 may operate within a test environment 74.

The data management system 14 may provide an analytics zone 40, an operationalized zone 42, and a user consumption zone 44. The analytics zone 40 may be accessed by developers 66 to analyze enterprise data 16 for creating/fixing/improving or otherwise manipulating data associated with existing or new applications, systems, services, tools, utilities or other software functionality within the enterprise system 12. While not shown in FIG. 2 for ease of illustration, the analytics zone 40 (as well as the user consumption zone 44) may include local storage, local compute clusters, and a jumpbox for performing read, write, access, and other data manipulation operations. The analytics and/or user consumption zones 40, 44 may output electronic data processing (EDP) commands or instructions for operationalizing the results of data processing performed within the respective zone 40, 44.

The operationalized zone 42 may include compute clusters to process data from a production DAC layer 50. The analytics and user consumption zones 40, 44 may also obtain such data. The operationalized zone 42 generates outputs for various downstream systems 46, e.g., via real time streaming, application programming interface (API) calls, open database connectivity messages, batch commands, etc. As illustrated in FIG. 2, the test environment 74 includes an operationalized area 62, which may text similar outputs to downstream systems 46, however, may include local storage, a jumpbox, and local compute clusters as needed.

To prepare data for the analytics zone 40, operationalized zone 42, and user consumption zone 44, data may be fed from various authoritative sources 48, e.g., batch or micro batch sources, relational database management systems (RDBMSs), streaming sources, etc. The data from the authoritative sources 48 may be provided to a landing zone 52, a raw data zone 54, and a curate data zone 56. These zones 52, 54, 46 may be provided by advanced distributed learning systems (ADLSs), for example. Data fed to the landing zone 52 and/or raw data zone 54 may be processed for the curated data zone 56 while some data may be considered curated data from the source. An archive data zone 58 may also be provided for archiving purposes. Similarly, a metadata management utility 60 may be included in the production DAC layer 50.

Data from the production DAC layer 50 may be provided to a DAC 34 in the test environment 74. For example, the DAC 34 in the test environment 74 may include one more Akora™ data zones that feed data to the operationalized area 62. The operationalized area 62 may generated EDP outputs 64 that may feed into the production environment 72, e.g., based on successful testing.

The data management system 14 may thus include various data processing functions and zones for utilizing enterprise data 16 in both production and test environments 72, 74. This enables continual and ongoing development, troubleshooting, analytics, testing and other operational processes used in the enterprise system 12. The DAC 34 functionality may be employed to control and restrict access to enterprise data 16, variations of which may apply depending on the sensitivity of the enterprise data 16, e.g., financial information versus social media data, versus public non identifiable information, etc.

Figure 3:
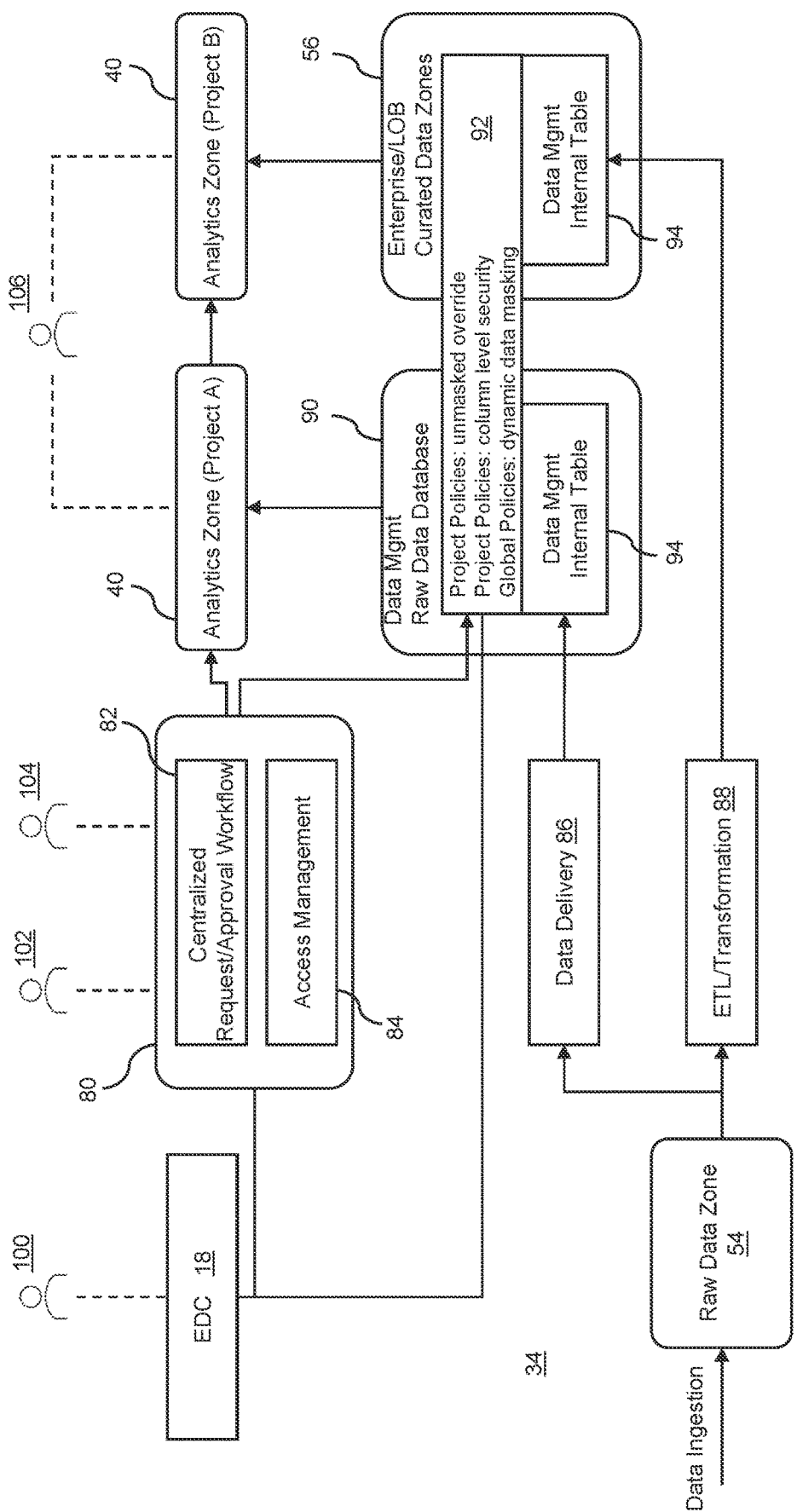
FIG. 3 is a schematic diagram of an example data access management configuration for providing data access to analytics zones in an enterprise system.

FIG. 3 illustrates further details of a solution for data access control via, for example, the DAC 34. In the architecture example shown in FIG. 3, the EDC 18 operated by data stewards 100 may be coupled to both a data access management module 80 and a raw data database 90 provided by the data management system 14 (e.g., a Synapse™ raw data database). Data ingestion feeds the raw data zone 54, which may perform two functions, namely simple data delivery 86 and extract/transform/load (ETL)/transformation 88. Simple data delivery 86 provides raw data from the raw data zone 54 to an internal table 94 provided by the data management system 14 in the raw data database 90. The ETL transformation 88 provides data to an internal table 94 provided in the curate data zone 56. The raw data database 90 and curated data zone(s) 56 include a number of policies 92. For example, the policies 92 may include project policies for a project user group where masking is overridden, project policies for a project user group with column level security (CLS) added, and global policies such as default dynamic data masking (DDM).

The data access management module 80 may be interacted with by approvers 102 and project owners 104. The module 80 in this example includes a centralized request/approval workflow 82 and an access management function 84. The data access management module 84 provides data and access management for both analytics zones 40 used by project users 106, and to the raw data database 90. The raw data database 90 and curate data zones 56 provide access to the raw data, either in its raw form or transformed, for the analytics zones 40 (e.g., Project A and Project B in FIG. 3).

Each project associated with an analytics zone 40 may have two user groups, namely approved users that access the project analytics zone 40 and those in a data access group which may access project-approved data. The analytics zones 40 may include a sandbox area and each project may provide system isolation (e.g., isolated network and a dedicated jump server), platform as a service (PaaS) services (e.g. Azure Databricks™), as well as desktop clients. It can be appreciated that in the configuration shown in FIG. 3, a separate dedicated instance provided by the data management system 14 (e.g., dedicated Synapse™ instance) may be used to host an extra copy of the raw data in a standardized raw data zone 54.

Raw data delivered from the raw data zone 54 to the data delivery module 86 and ETL/transformation module 88 may be scheduled (e.g., daily) to be loaded into the internal tables 94. As global policies, default DT (e.g., masking) may be applied and periodically synchronized with the EDC 18. A project owner 104 may request access to either the raw and/or curated data in the data management system 14 (e.g., via a Synapse™ account). Approvers 102 may control partners' data access requests. Project level policies to access approved columns in the data may be set up from project-specific data access groups and project users 106 may access data using a provisioned project analytics zone 40, according to permissions and user access requirements.

Figure 4:
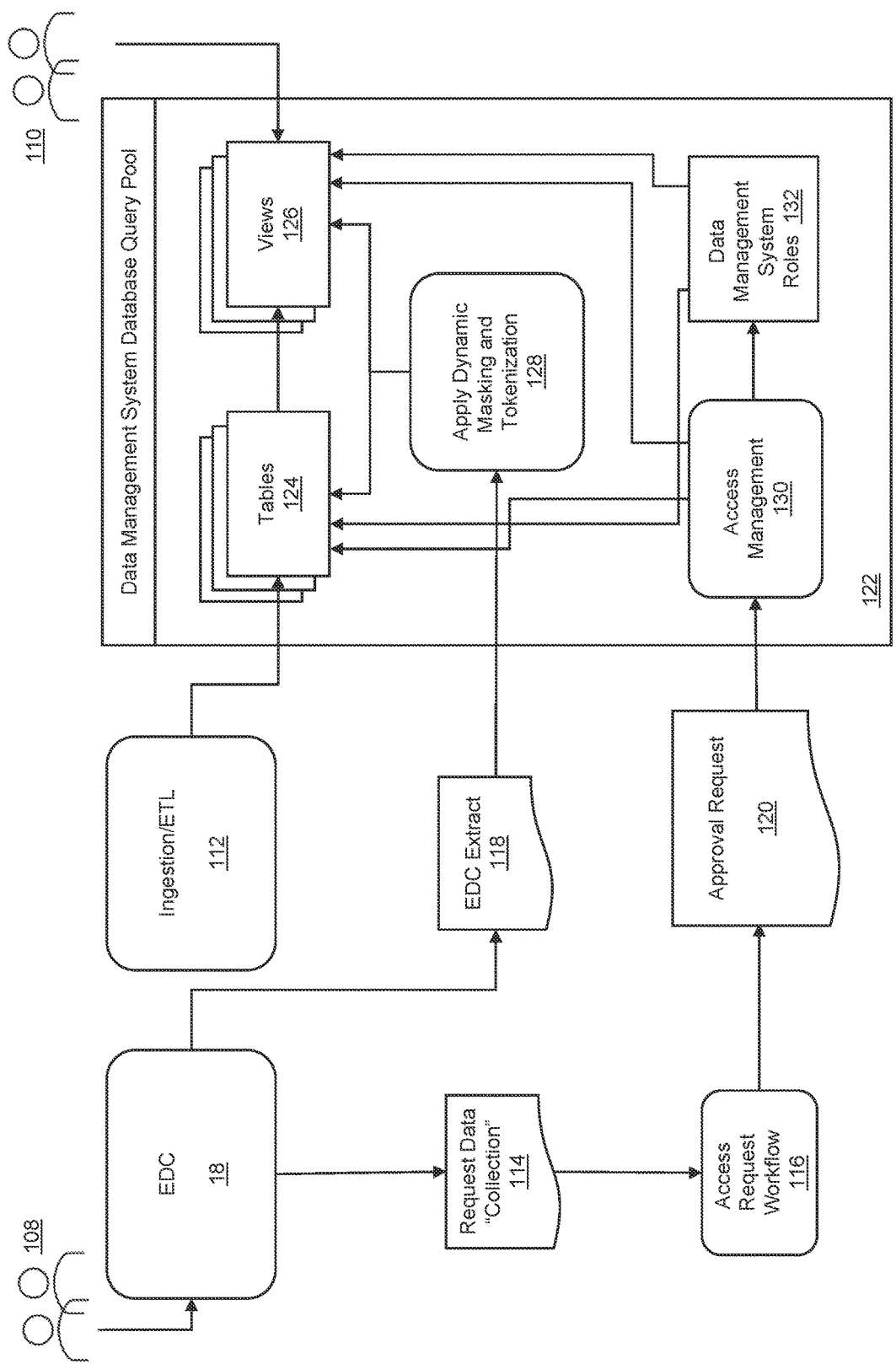
FIG. 4 is a schematic diagram of an example of a data management system configuration for utilizing data from an enterprise data catalogue.

Referring now to FIG. 4, access data treatment enforcement workflows are shown, to apply access enforcement (i.e. appropriate masking and data treatment functions) based on the data treatment values of the EDC 18. An ingestion/ETL module 112 feeds data into a query pool 122. In this example, access may be sought by requestors 108 and other users 110 may interact with the query pool 122 provided by the data management system database from an analytics zone 40.

A requestor 108 may request a data collection at 114 via the EDC 18 or may request an EDC extract operation at 118. The request at 114 may trigger an access request workflow 116 which generates an approval request 120. The approval request may include path(s), schema, table, column, default data treatment, approved data treatment, group, date(s), etc. The approval request 120 is handled within a query pool 122 by an access management module 130, which relies on data management system roles 132 to provide access to tables 124 and views 126. The tables 124 may be redacted or partially redacted based on the DDM policy and the views 126 may be affected by tokenization logic. Dynamic masking and tokenization may be performed at block 128 according to an EDC extract request at 118, which originates from the EDC 18.

The data access framework shown in FIG. 4 may apply access enforcement (e.g., appropriate masking and data treatment functions) based on the EDC Data Treatment Value. DDM may be used to implement redaction and partial redaction for internal tables. Strong with referential integrity (i.e., tokenization) data treatment can be achieved using a case statement that is applied directly to the column in the view.

Data stewards 100 and data owners may be made responsible for properly classifying their data treatment values inside the EDC 18. The default value may be "Not Populated", which results in redact data treatment being applied to the column. That is, if metadata is missing, the data may be fully redacted.

The data access solution can support the following data treatment types:
a) Redact (full redaction such as NULL or replacing with single value such as 0's).
b) Partial Redact (Cdn Postal Code) (for character/string type values, Canadian postal code masked as M5Kxxx).
c) Partial Redact (US ZIP) (for character/string type values, US ZIP code masked as 902xx).
d) Strong with Referential Integrity (also referred to as "deterministic tokenization": a one-way/vault-less hashing of value to produce consistently transformed values, using a combination of T-SQL Functions such as HASHBYTES, REVERSE and CAST.
e) Rounding (Round (1000) and Round (10000): Rounding is performed through values being rounded into buckets that are integer multiples of the 'nearest' parameter. Examples could be (Round (1000)) 1526 to 2000 and (Round (10000)) 15269 to 20000.
f) Partial Redact (Date) (Fetch the year values (first four) only using SQL functions like: 1900 Jan. 1 becomes 1900).
g) Generalize (Age) (Supported age between 14 and 90; and intermediate values will be converted to the lowest 5s multiple like 27 will be converted to 25).

Full redaction can be implemented as a DDM capability. Users may need to request access to data on a per column basis. The access request workflow (see also FIGS. 5a and 5*b* described below) can specify which column the user/group needs access to as well if the data will be masked or in the clear.

The EDC fields for applying data treatment may be as follows:
- ZONE—Zone specified for the data.
- EDC_MODEL—Model Name inside EDC.
- MAL—MAL Code associated with the data.
- SCHEMA—Schema name of entity.
- TABLE—Table name of entity.
- COLUMN—Column name of entity.
- DATATREATMENT—Redact, Partial Redact, Strong with Ref. Integrity, Not Populated, None.
- LAST_MODIFIED—Date treatment value updated or added to table.

The DAC 34 may be configured to not make use of "Security Classification" or "Security Classification Candidate" or other "candidate" or reviewed/validated fields. In such a case, only the DT value specifies which DT is applied to the Table/View 124/126.

Other classification or data type tagging fields such as personally identifiable information (PII), may not be used as they are yet to be in prod and likely will not be populated. If approved DT does not match the DT that has been applied through the EDC extract process, the end user may receive SELECT access, however the unmask access would need to be re-approved.

If DT is missing or invalid, the default may be "Not Populated" when data treatment is "Not Populated" the system 14 may grant SELECT access but cannot grant unmask column until Data Steward/Owners update Data Treatment in EDC.

Data discovery, for the purpose of interim data access, may be required for users who are requesting access to the data. Data access may be granted to a shared user account, the AAD Group, and not the individual data consumers. The AAD Group may be assigned as one per analytics zone 40. Each project has an analytics zone 40. Therefore, one can limit the access request process, and therefore the data discovery and EDC usage, to the project owners.

Figure 5A:
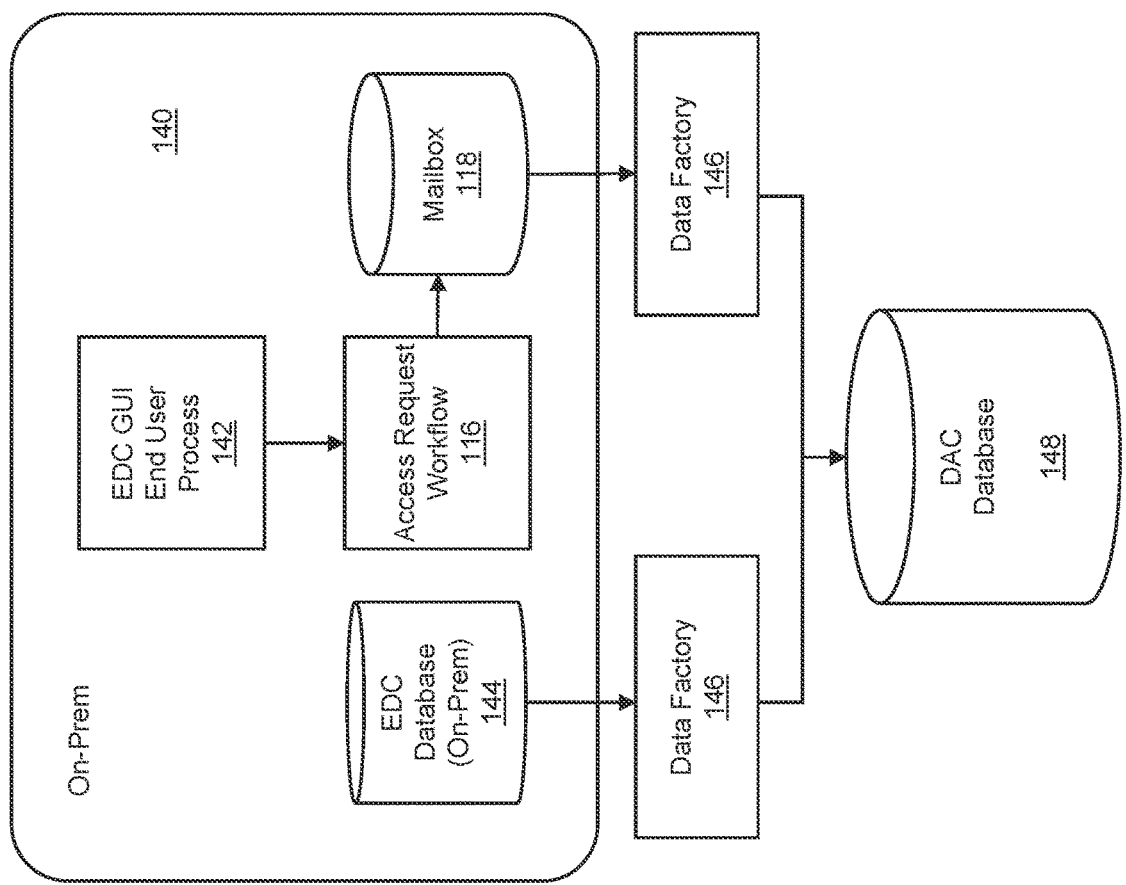
FIGS. 5a and 5b illustrate enterprise data catalogue and access management workflows for reconciling data used in an analytics zone.

Referring now to FIG. 5*a*, users "on prem" 140 may be able to discover metadata inside the EDC GUI 142. The users may create a "collection" that will then be exported from EDC database 144 and start the Access Request Workflow 116. Users may only discover the metadata that is associated with the entity (table/view).

The access request workflow 116 may then review the request as well as gather the necessary approvals for the data that has been selected, as well as the DT Option. Once all the necessary approvals are in place, the access request workflow 116 may drop the files into a (Tibco™) mailbox 118. The requests should be segregated by project, group, or analytics Zone 40. Once the files are available in the mailbox 118, a data factory 146 (e.g., Azure Data Factory (ADF)) may be configured to run on a nightly basis to process the approved requests and move files to the DAC database 148.

Figure 5B:
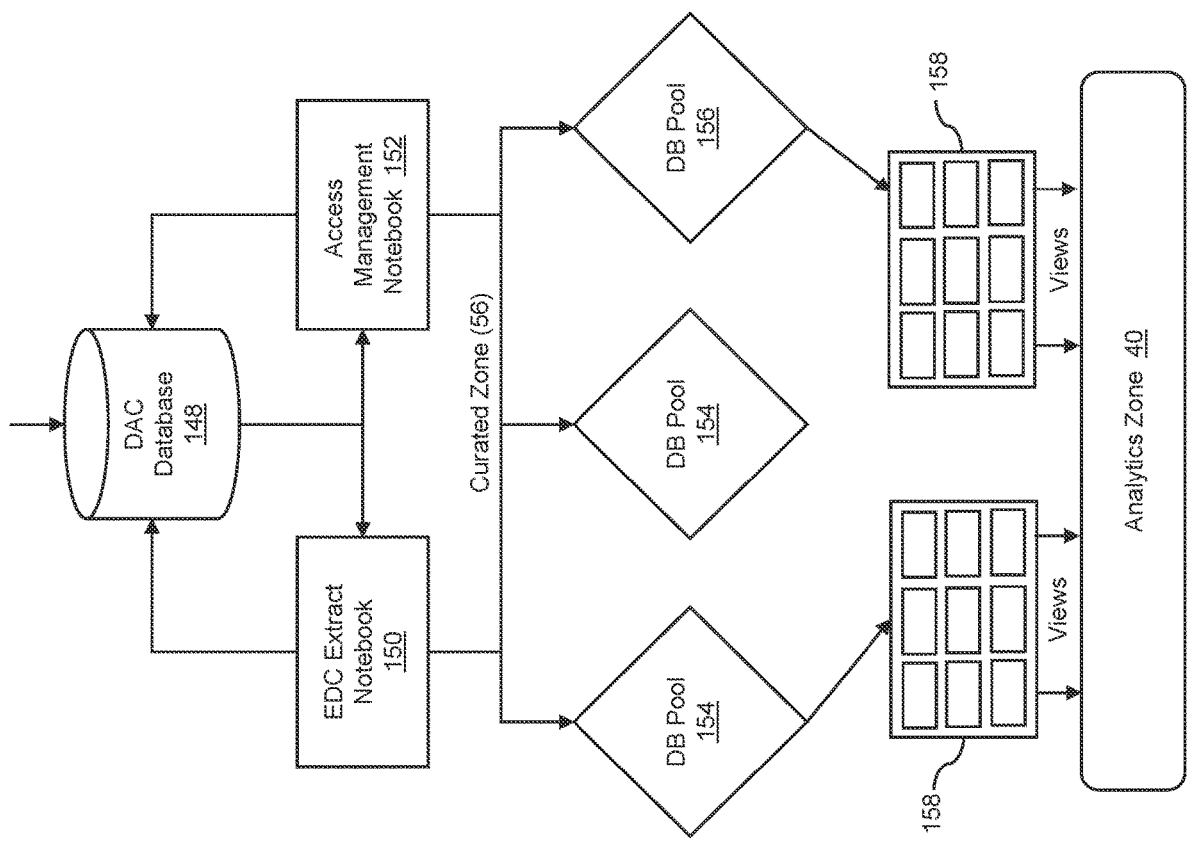

The DAC 34 applied the approved DT value gathered from an EDC Extract notebook 150 to the Tables and Views 158 of the Curated Zone(s), as shown in FIG. 5*b*. The curated zone 56 may use multiple database (e.g., SQL) pools 154 to process the EDC extract notebook 150 and an access management notebook 152 in parallel as described further below. The results are provided in views 158, which are then analyzed in the analytics zone 40.

The supported formats may include: Strong with Ref. Integrity/Tokenization, Redact, Partial Redact (Cdn Postal Code), Partial Redact (US ZIP), Not Populated [default], None, Round (1000), Round (10000), Generalize (Age), and Partially Redact (Date). DAC 34 may provide read access as approved by the access request workflow 116 to the views in 158 in the curated zone(s) 56 database Pools 154.

The configuration may be capable of monitoring and logging all DT Syncs and approved data access requests for each analytic zone 40/group and/or instance and may be capable of dynamically updating DTs as required by EDC extract functionality. Metadata may be available in the EDC 18 for DAC 34 to apply DTs and grant access.

Data Reconciliation

Figure 6:
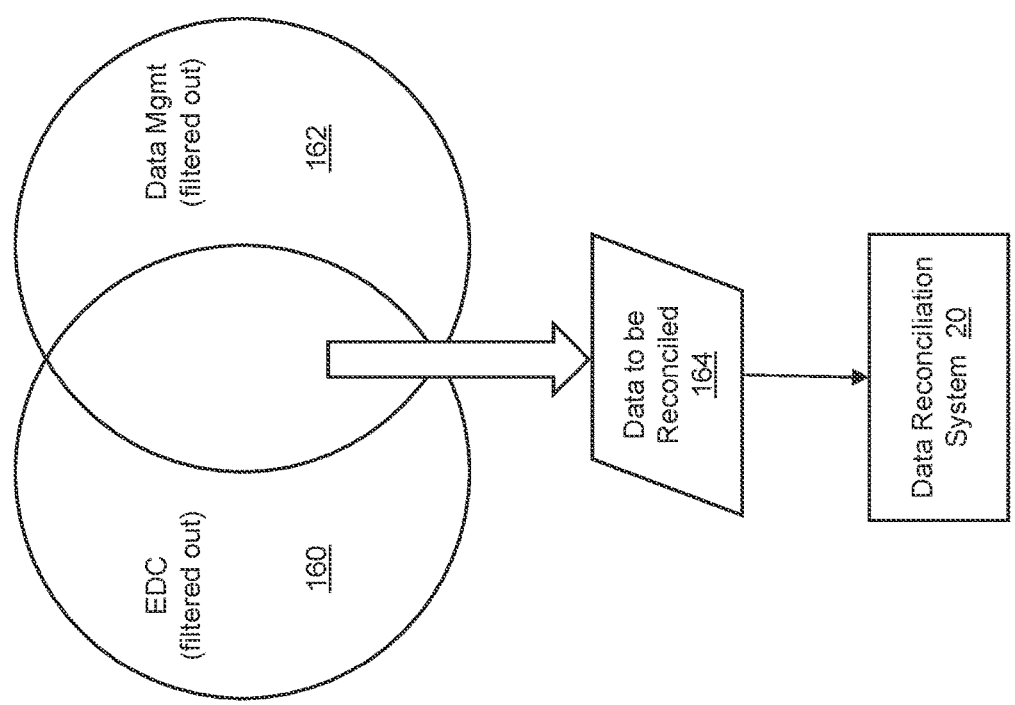
FIG. 6 illustrates data reconciliation for an enterprise data catalogue workflow.

As indicated above, the DAC 34 and data management system 14 utilizing the EDC 18 may utilize copies of the data used in an operational setting for other uses, such as testing, analytics, etc., e.g., within an analytics zone 40. As such EDC logic may be implemented to perform data reconciliation using the data reconciliation system 20 in one example. In the following data reconciliation process, multi-threading may be implemented, with pools 154 being processed concurrently. The EDC component for a pool 154 processes (see FIG. 6), then an AMI component processes (see FIG. 8) while in parallel the same is happening for the other pools 154. Processing and execution stages may then happen at the same time per pool 154, e.g., by having the notebooks 150, 152 (see FIG. 5*b*) merged into one. It may be noted that this enables switching from a one ended (DAC only) status-reliant approach to a relatively frequent (e.g., daily) data management (e.g. Synapse™) snapshot to do data reconciliation.

The new EDC logic can take records from the EDC input and compare with each respective database pool 154 to check for discrepancies between the DT in the EDC input and what is applied on the database pools 154. If there is a discrepancy between the input table and the database pool 154, this means the data management system 14 may need to apply the masking/tokenization on that column based on what is in the input table. As noted, an enhancement here to prior approaches is to combine the process and execute notebooks into one. Processing may then happen concurrently on all pools 154 and execution happens immediately for each pool. This can make the process faster and more efficient.

When comparing the DAC logic described herein to prior approaches, with respect to combining of process and execute notebooks, before: "processing" (preparing of statements) on all pools would happen then "execution" (running of statements). However, now: processing and execution happens immediately, without the need to wait for all processing for all pools 154 to happen before execution—as one pool 154 has no dependency on another.

With respect to multi-threading, before: sequential execution occurred where pool A must wait for pool B to finish execution. However, now: concurrent execution means that pool A and pool B execute at the same time, such that pool A does not need to wait for pool B if pool B is very slow, for example.

Referring again to FIG. 6, data to be reconciled 164 and sent to the data reconciliation system 20 may be determined on a frequent basis, e.g., daily. As shown, filtered out EDC data 160 (i.e. the baseline dataset) is compared to filtered out data management system (e.g., Synapse™) data 162 (i.e. the input dataset). That is, it is determined that only data that resides in both sources may need to be reconciled. The data reconciliation system 20 may then be used to determine which records that exist in both have discrepancies and then apply the DT that the input table dictates.

Figure 7:
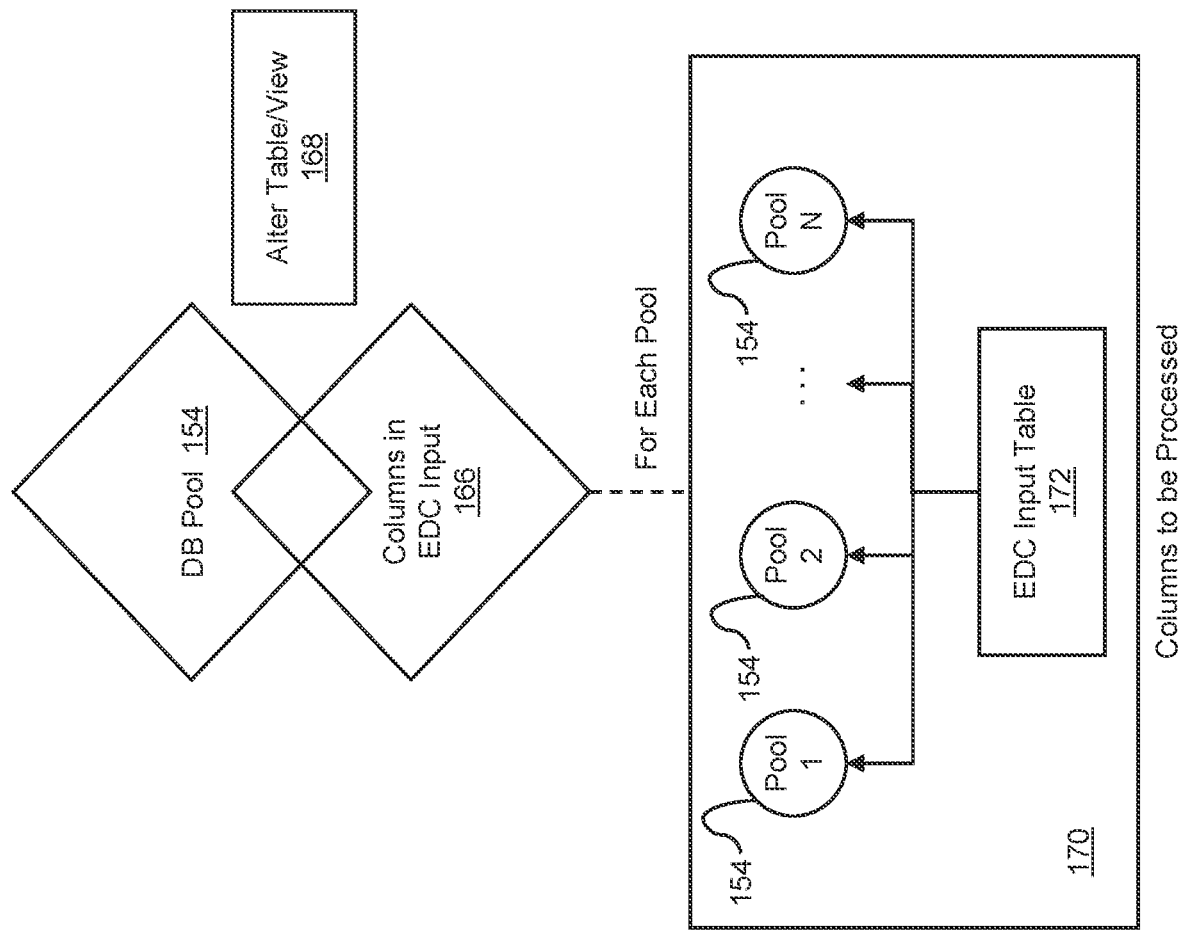
FIG. 7 illustrates database column processing using multiple parallel database pools.

As shown in FIG. 7, the table/view may be altered at block 168 by creating and executing statements for the columns in the EDC input 166 that overlap the database pool 154 where the DT does not match. For each pool 154, the data reconciliation system 20 may check with each database pool 154 to determine the values that are NULL in the EDC 18. Those records may then be taken and each database pool 154 is processed on its own thread to create and execute the statements.

Figure 8:
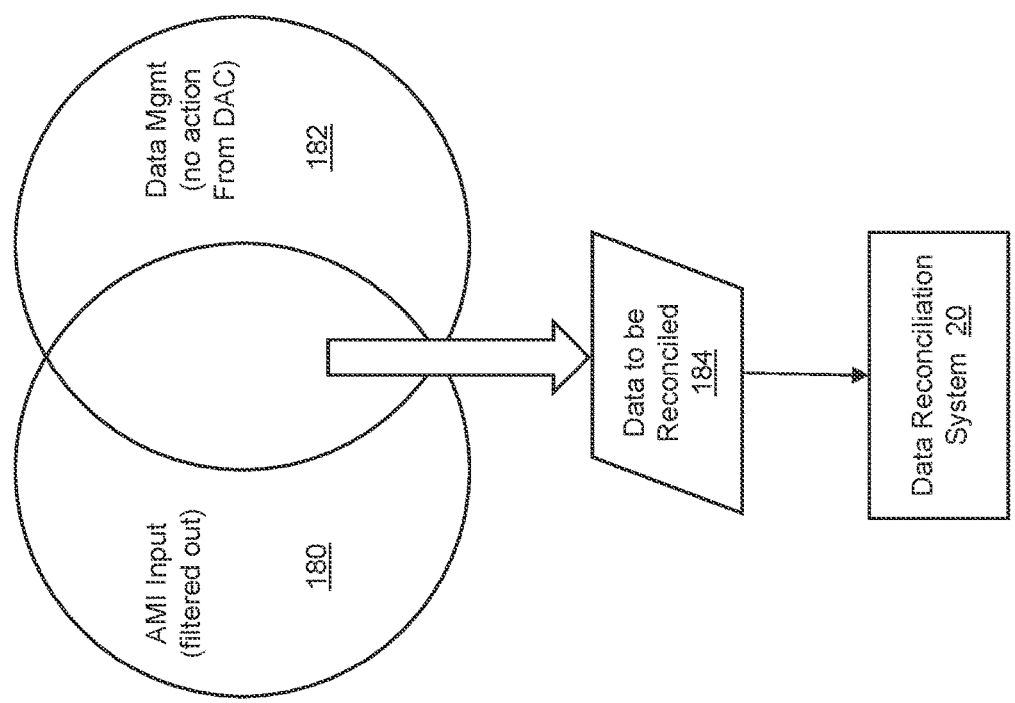
FIG. 8 illustrates data reconciliation for an access management interface workflow.

Referring now to FIG. 8, similarly, AMI logic may also reconcile the requests in the input table and the permissions for each group in the data management system 14. As such, requests in AMI that does not exist in the data management system 14 may be filtered out from processing. The filtered out AMI data 180 that overlaps data filtered out from the data management system 14 based on no action from DAC 34 to generate data to be reconciled 184. This data to be reconciled 184 may then be processed by the data reconciliation system 20. This ensures that access management permissions are reconciled frequently to given groups the most up-to-date permissions.

In summary, as the process and execute notebooks may be combined while removing cross checking with EDC lookup, i.e., only process what is NULL in input. The system 20 may concurrently check database pools 154 for discrepancies with the input table and concurrently execute statements for pools 154 that have finished processing without the need to wait for processing to finish. The system 20 may create delta tables to extract the database pool 154 into and statements can be created based on the value edc_input. The system 20 may update in processing by now picking up an entire table for reprocessing if any of its column status or new column comes in (to deal with tokenized columns). The system may create a column in the EDC input for clear role name, create a column in the EDC input for comment, lookup tables may no longer be used, and execution tables may be used for audits.

Support Pipelines

Figure 9:
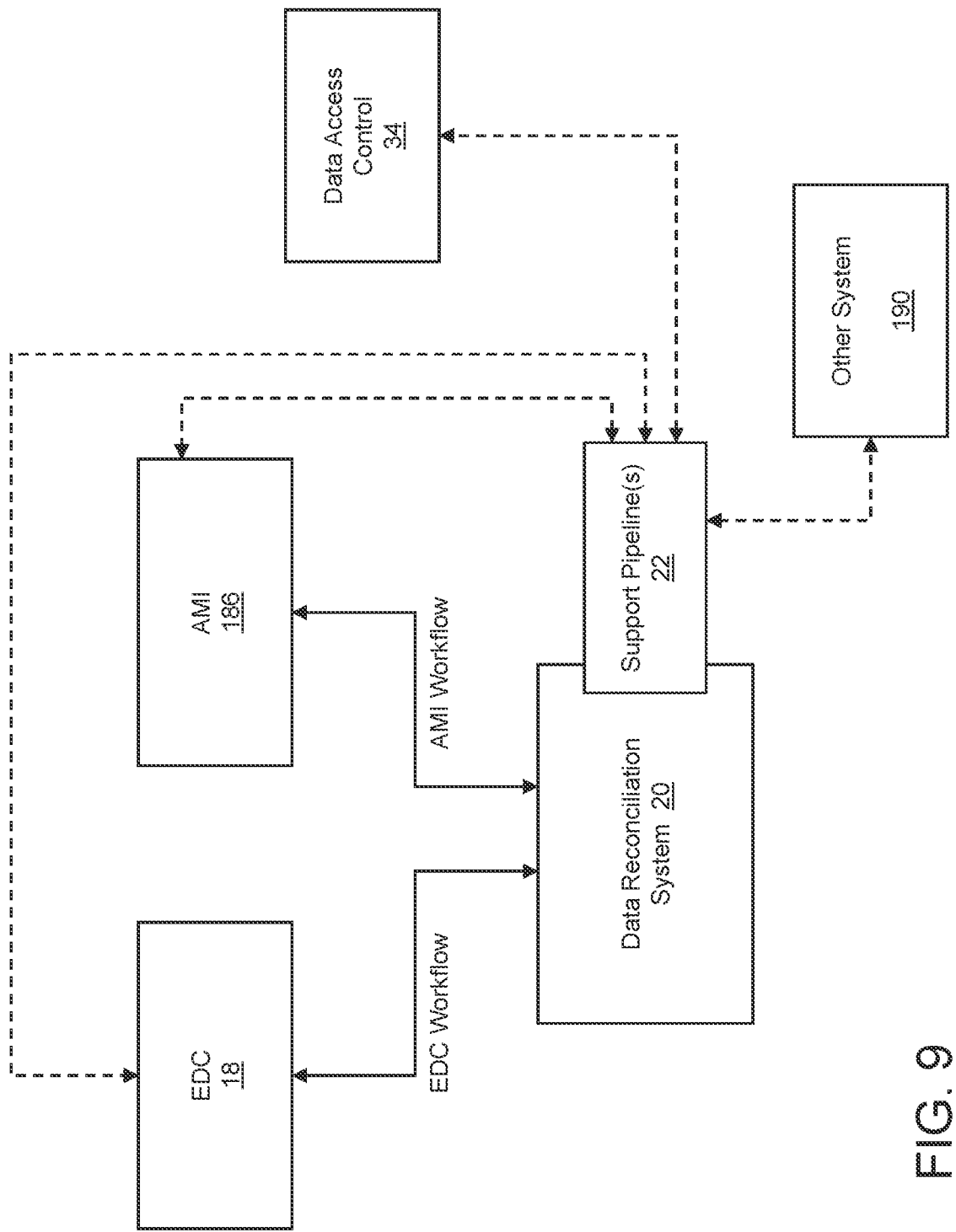
FIG. 9 illustrates integration of one or more support pipelines with a data reconciliation system to automate repetitive tasks within a data access control framework.

Referring now to FIG. 9, the support pipeline(s) 22 can be used to provide a support framework for the data reconciliation system 20 and the data management system 14 more generally to support data stewardship by automating task, such as repetitive and time consuming tasks. The support framework provided through the support pipelines 22 can automate such repetitive tasks by creating pipelines that auto-generate database (e.g., SQL) queries. The support pipelines 22 can be configured to communicate with various systems within the computing environment 10, such as the EDC 18, the AMI 186, the DAC 34, and various other systems 190.

The framework provided by the support pipelines 22 can reduce dependencies on DB Ops. The support pipelines 22 can be developed to activate/inactivate records in the EDC 18 such as bad data. Other support pipelines 22 can be implemented to update DT status in DAC 34 to force reprocessing of certain columns. All pipeline parameters are to be passed with single quotes separated by commas for multiple—with the exception of Data_treatment_status (pass as 0 or 1 or NULL with no quotes).

For example pass multiple MAL codes - - - >'mal1', 'mal2', 'mal3'. Pass single MAL codes as 'mal1'. An asterisk "*" will translate to "is NOT NULL".

Various support pipelines 22 are now described.

First, the AM_Input_Status_Reset. This activity will update the Access_Management_Input table with Data_Treatment_Status based on given parameter value. Active is hard coded to =1.

Set_Data_Treatment_Status valid values:
NULL
0
1
*=is not NULL
value='value'—value must be in single quotes—for multiple values, separate by a comma.
blank='dummy' (DEFAULT value) do not leave blank. See Table 1 below:

TABLE 1

Sample Parameter Values

| Parameter | Possible values |
| --- | --- |
| Set_Data_Treatment_Status | 0 or 1 or NULL (NULL has to be capital) (no quotes here at all) |
| Mal_code | * or 'value' or 'value', 'value', 'value' |
| Schema_Name | * or a 'value' or 'value', 'value', 'value' |
| Table_Name | * or a 'value' or 'value', 'value', 'value' |
| Column_Name | * or a 'value' or 'value', 'value', 'value' |
| Data_treatment | * or a 'value' or 'value', 'value', 'value' |
| Data_Treatment_Status | * or 'value' or NULL (no quotes NULL) |
| Seq_ID | * or 'value' or NULL (no quotes NULL) |

The above pipeline 22 may be used to be able to reset the DAC DT status column for the EDC 18. This may force a reprocessing of a column when necessary data treatment or security was not applied correctly and needs to be forced to re-run.

Other pipelines 22 may be created, for example an Active_EDC_Reset, which can be created to set a DAC active value for a column to 1 or 0 in the EDC input table. This may be used to handle issues such as incorrect submissions from upstream to the DAC 34, which may cause the DAC 34 to continue processing and failing incorrect entries.

Another example is an Active_AMI_Reset pipeline 22, which can be created to be able to set DAC active flag for a column to 1 or 0 in the AMI Input table. This pipeline 22 can be used to handle issues such as incorrect submissions from upstream to the DAC 34 which may cause the DAC 34 to keep processing and failing incorrect entries.

Yet another example, is an Update_EDC_Extract_Control_Date pipeline 22. This pipeline 22, can be created to be able to manually change DAC's extract control date in the case where there is a discrepancy between EDC 18 and DAC 34. This activity can update the dac.Extract_Control table with parameterized extract date. The date may then get converted to DateTime.

A sample query is as follows:
update dac.EXTRACT_CONTROL
Set Extract_Date='2022 Oct. 9'

In another example, a Drop_create_user pipeline 22 may be created to be able to create or drop a user in the respective SQL pool when the onboarding isn't setup properly. The parameters are provided in the following example:

TABLE 2

Drop Create Parameters

| Parameter | Possible values |
| --- | --- |
| user_name | pass user to drop or create with no quotes |
| server_name | pass server name with no quote |

TABLE 2-continued

Drop Create Parameters

| Parameter | Possible values |
| --- | --- |
| DB_name | pass db name with no quotes |
| operation_type | drop or create |
| notebook_path | notebook/notebook/dev |

In general, the support pipelines 22 can be created by providing a tool or utility to convert a task into a database query such as an SQL query to automate a repetitive task. Such tasks are typically not automated when configuring a data management system 14 such as that described herein and thus the support pipelines 22 provide a way to inject automated database management into an existing system or a new system being provisioned.

Figure 10:
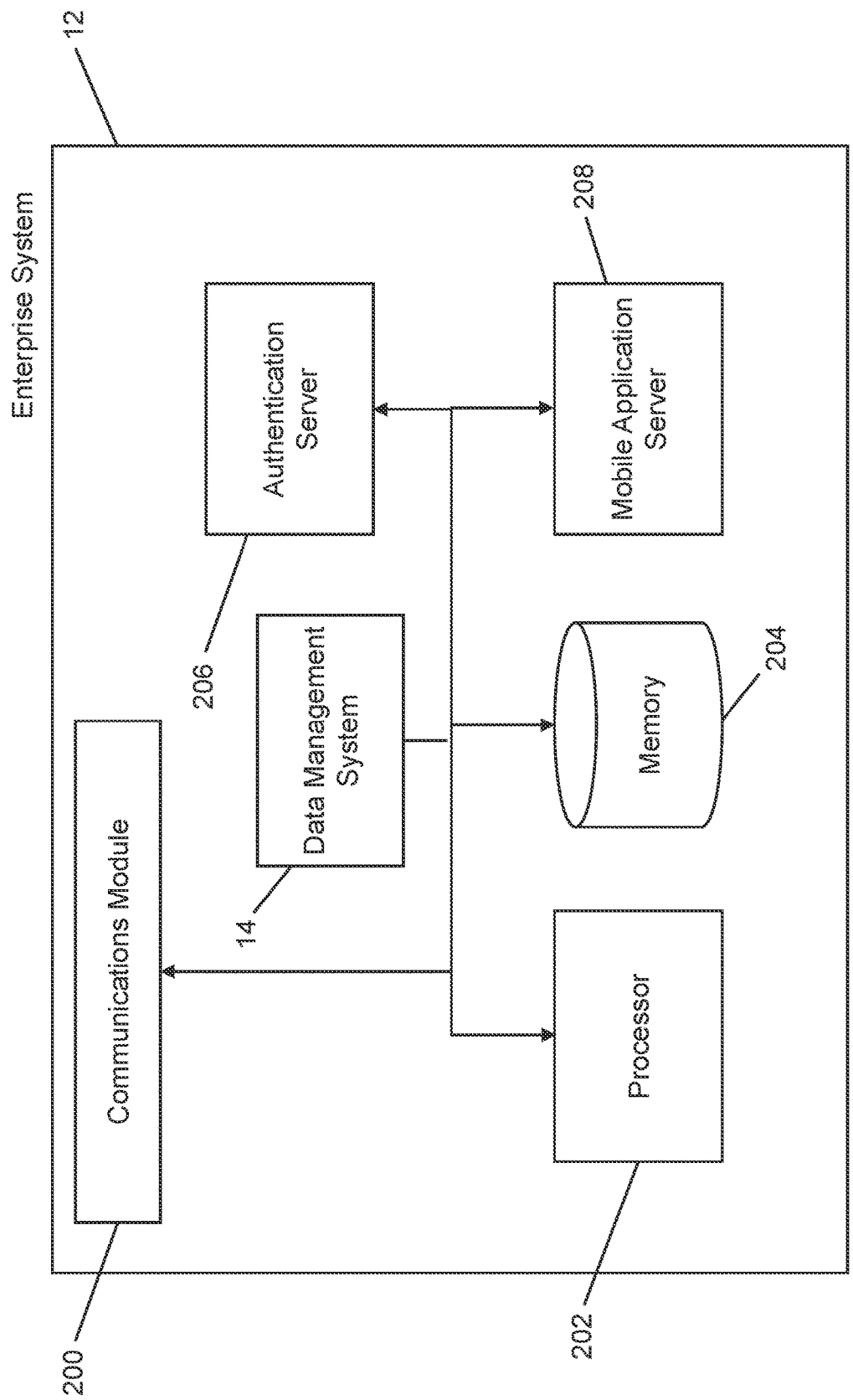
FIG. 10 is a block diagram of an example configuration of an enterprise system.

In FIG. 10, an example configuration for an enterprise system 12 is shown. In certain embodiments, the enterprise system 12 may include one or more processors 202, a communications module 200, and a database interface module (not shown) for interfacing with remote or local datastores to retrieve, modify, and store (e.g., add) data and information and/or data resources. Communications module 200 enables the enterprise system 12 to communicate with one or more other components of the computing environment 10, such as a user device 26 (or one of its components), via a bus or other communication network, such as the communication network 24. The enterprise system 12 can include at least one memory or memory device 204 that can include a tangible and non-transitory computer-readable medium having stored therein computer programs, sets of instructions, code, or data to be executed by processor 202.

FIG. 10 illustrates examples of modules, tools and engines stored in memory on the enterprise system 12 and operated or executed by the processor 202. It can be appreciated that any of the modules, tools, and engines shown in FIG. 10 may also be hosted externally and be available to the enterprise system 12, e.g., via the communications module 200. In the example embodiment shown in FIG. 10, the enterprise system 12 includes an authentication server 206, for authenticating users to access resources of the enterprise, and mobile application server 208 to facilitate a mobile application that can be deployed on mobile user devices 26. The enterprise system 12 can include an access control module (not shown) and/or cryptographic server(s) as noted above.

Figure 11:
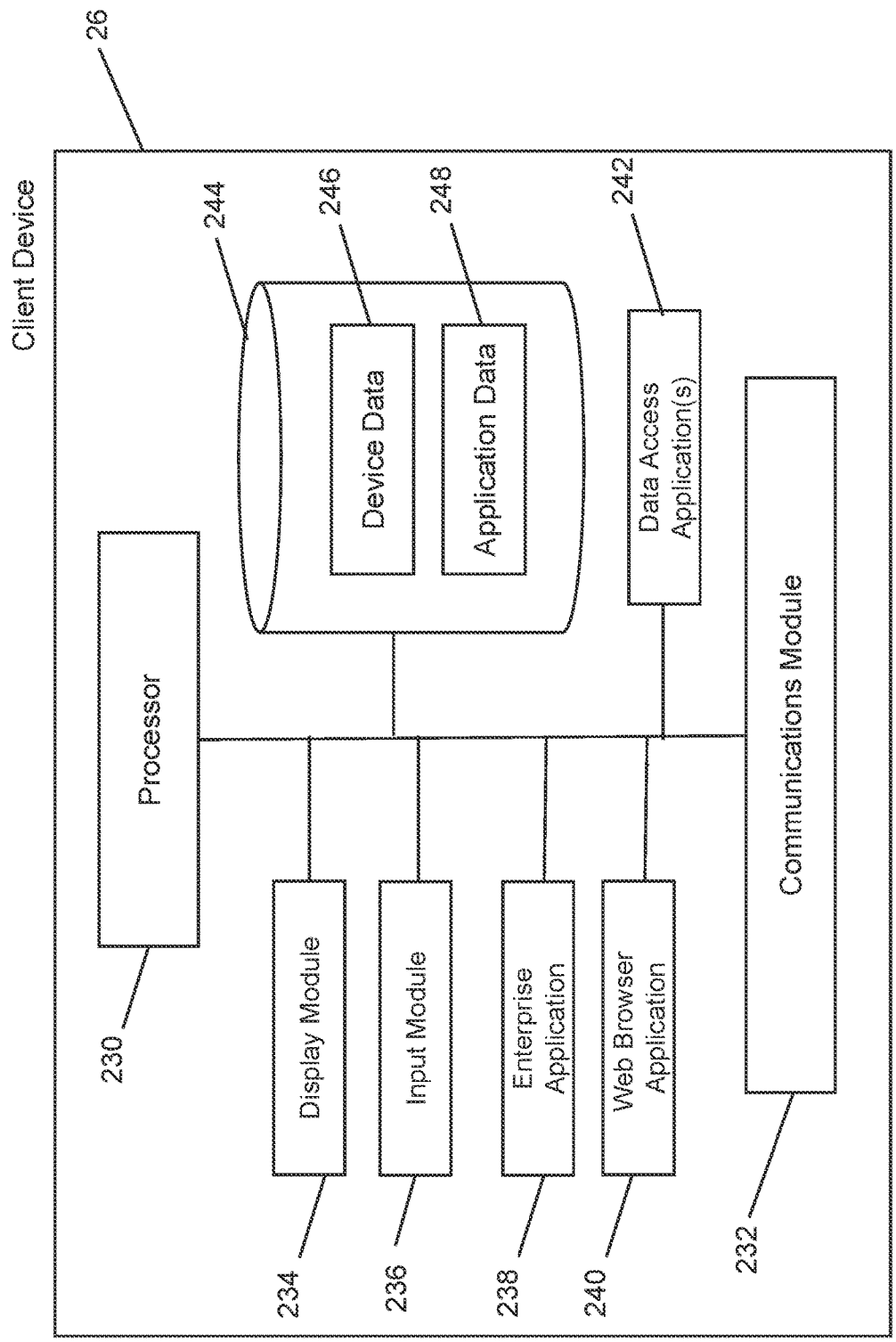
FIG. 11 is a block diagram of an example configuration of a user device.

In FIG. 11, an example configuration of a user device 26 is shown. In certain embodiments, the user device 26 may include one or more processors 230, a communications module 232, and a data store 244 storing device data 246 and application data 248. Communications module 232 enables the user device 26 to communicate with one or more other components of the computing environment 10, such as enterprise system 12, via a bus or other communication network, such as the communication network 24. While not delineated in FIG. 11, the user device 26 includes at least one memory or memory device that can include a tangible and non-transitory computer-readable medium having stored therein computer programs, sets of instructions, code, or data to be executed by processor 230. FIG. 11 illustrates examples of modules and applications stored in memory on the user device 26 and operated by the processor 230. It can be appreciated that any of the modules and applications shown in FIG. 11 may also be hosted externally and be available to the user device 26, e.g., via the communications module 232.

In the example embodiment shown in FIG. 11, the user device 26 includes a display module 234 for rendering GUIs and other visual outputs on a display device such as a display screen, and an input module 236 for processing user or other inputs received at the user device 26, e.g., via a touchscreen, input button, transceiver, microphone, keyboard, etc. The user device 26 may also include an enterprise application 238 provided by the enterprise system 12, e.g., for submitting requests to perform mobile banking, investing, or other performing financial services. The user device 26 in this example embodiment also includes a web browser application 240 for accessing Internet-based content, e.g., via a mobile or traditional website and one or applications (not shown) offered by the enterprise system 12 or data management system 14, and a data access application 242 for accessing data via the data management system 14. The data store 244 may be used to store device data 246, such as, but not limited to, an IP address or a MAC address that uniquely identifies user device 26 within environment 10. The data store 244 may also be used to store authentication data, such as, but not limited to, login credentials, user preferences, cryptographic data (e.g., cryptographic keys), etc.

It will be appreciated that only certain modules, applications, tools, and engines are shown in FIGS. 2 to 11 for ease of illustration and various other components would be provided and utilized by the data management system 14, enterprise system 12, and user device 26, as is known in the art.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, any component of or related thereto, etc., or accessible or connectable thereto (e.g., enterprise system 12, data management system 14, user device 26, etc.). Any application or module herein described may be implemented using computer readable/executable instructions that may be stored or otherwise held by such computer readable media.

Figure 12:
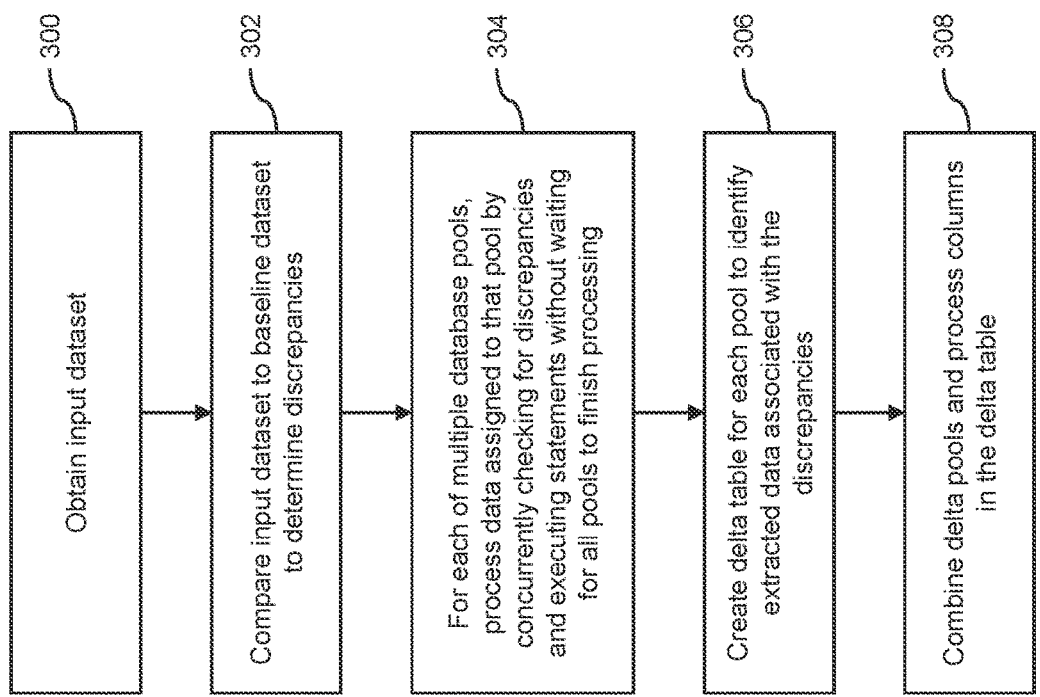
FIG. 12 is a flow chart illustrating example operations that may be performed in reconciling data used by a data management system.

Referring to FIG. 12, a flow chart is provided illustrating operations that may be performed in reconciling data used by a data management system 14.

At block 300 the data reconciliation system 20 obtains an input dataset, e.g., a set of data being used by the data management system 14 for analytics, testing, development or other processing. At block 302, the data reconciliation system 20 compares the input dataset to a baseline dataset to determine discrepancies. The baseline dataset corresponds to the EDC 18 or a portion thereof.

At block 304, the discrepancies are determined, for each of multiple database pools 154, by processing data assigned to that pool by concurrently checking for the discrepancies and executing statements without waiting for all pools to finish processing.

At block 306, a delta table is created for each pool 154 to identify extracted data associated with the discrepancies. At block 308, the delta pools are combined and columns associated with the delta table are processed.

Figure 13:
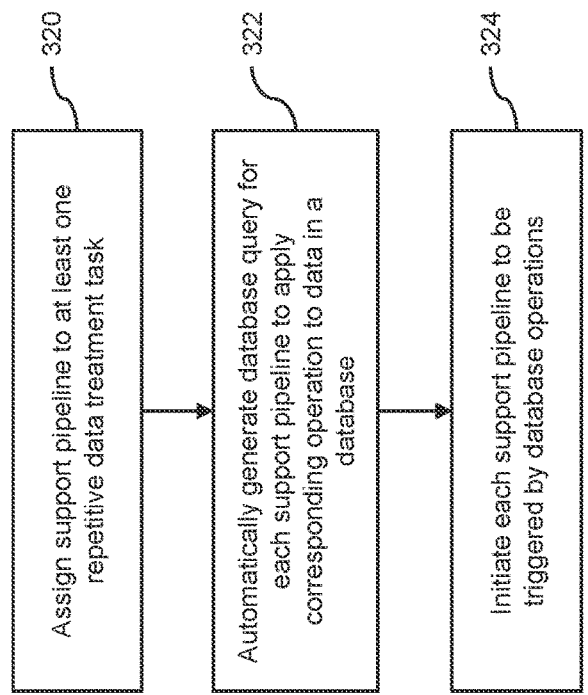
FIG. 13 is a flow chart illustrating example operations that may be performed in executing supporting operations in a data management system.

Referring to FIG. 13, a flow chart is provided illustrating operations that may be performed in executing supporting operations in a data management system 14.

At block 320, a support pipeline 22 is assigned to each of at least one repetitive data treatment task, such that one more support pipelines 22 are automatically generated.

This may be done, at block 322, by automatically generating a database query for each of the support pipelines 22 to apply a corresponding operation to data in a databased associated with the data management system 14.

At block 324, each support pipeline 22 may be initiated to be triggered by database operations, which may occur automatically or manually.

It can be appreciated that the operations shown in FIG. 13 may execute in conjunction with those shown in FIG. 12, such that the support pipelines 22 are utilized, called or otherwise triggered in connection with a data reconciliation process, e.g., to automate certain repetitive tasks.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer system for reconciling data used by a data management system, the computer system comprising:
    a processor;
    a data interface coupled to the processor; and
    a memory coupled to the processor and the data interface, the memory storing computer-executable instructions that, when executed by the processor, cause the system to:
        obtain an input dataset, the input dataset being replicated from a baseline dataset to enable the data management system to operate on the input dataset;
        determine a plurality of database pools, each associated with activities that can run independent from one another;
        automatically reconcile the input dataset with the baseline dataset on a periodic basis using the plurality of database pools by executing logic to:
            concurrently process data assigned to each of the plurality of database pools by checking the input dataset for discrepancies with the baseline dataset, wherein each database pool is processed on a separate thread of a multi-thread execution performed by the processor;
            immediately and without waiting for all of the database pools to have finished processing, independently and concurrently execute statements, via the multi-thread execution, for any of the database pools that have finished processing; and
            create a delta table for each database pool to identify extracted data associated with the discrepancies between the input and baseline datasets; and
        combine delta tables from the plurality of database pools into a combined delta table and process columns associated with the combined delta table to execute an update based on any changes.

2. The system of claim 1, wherein the computer-executable instructions, when executed by the processor, further cause the system to:
    apply a data treatment process to at least one column in one or more of the delta tables or the combined delta table.

3. The system of claim 1, wherein the discrepancies are determined using metadata associated with at least one of the input dataset and the baseline dataset.

4. The system of claim 1, wherein the computer-executable instructions, when executed by the processor, further cause the system to:
    filter the input dataset and the baseline dataset to determine an overlapping set of data to be reconciled.

5. The system of claim 1, wherein the pools are SQL pools.

6. The system of claim 1, wherein the baseline dataset comprises data from an enterprise data catalogue and the input dataset comprises data from the data management system that has been copied for processing independent of operations of an enterprise system.

7. The system of claim 6, wherein the data management system provides curated data to be used in an analytics zone, the curated data being generated by reconciling the input dataset with the baseline dataset.

8. The system of claim 1, wherein the computer-executable instructions, when executed by the processor, further cause the system to:
    generate logging statements for each database pool;
    use temporary tables to store the logging statements; and
    combine the logging statements.

9. The system of claim 1, wherein the baseline dataset comprises data from an access management input and the input dataset comprises data from the data management system that has been copied for processing independent of operations of an enterprise system.

10. The system of claim 1, wherein the data management system provides a workspace for machine learning.

11. A method for reconciling data used by a data management system, the method comprising:
    obtaining an input dataset, the input dataset being replicated from a baseline dataset to enable the data management system to operate on the input dataset;
    determining a plurality of database pools, each associated with activities that can run independent from one another;
    automatically reconciling the input dataset with the baseline dataset on a periodic basis using the plurality of database pools by executing logic to:
        concurrently process data assigned to each of the plurality of database pools by checking the input dataset for discrepancies with the baseline dataset, wherein each database pool is processed on a separate thread of a multi-thread execution performed by the processor;

immediately and without waiting for all of the database pools to have finished processing, independently and concurrently execute statements, via the multi-thread execution, for any of the database pools that have finished processing; and create a delta table for each database pool to identify extracted data associated with the discrepancies between the input and baseline datasets; and combining delta tables from the plurality of database pools into a combined delta table and process columns associated with the combined delta table to execute an update based on any changes.

12. The method of claim 11, further comprising:
applying a data treatment process to at least one column in one or more of the delta tables or the combined delta table.

13. The method of claim 11, wherein the discrepancies are determined using metadata associated with at least one of the input dataset and the baseline dataset.

14. The method of claim 11, further comprising:
filtering the input dataset and the baseline dataset to determine an overlapping set of data to be reconciled.

15. The method of claim 11, wherein the baseline dataset comprises data from an enterprise data catalogue and the input dataset comprises data from the data management system that has been copied for processing independent of operations of an enterprise system.

16. The method of claim 15, wherein the data management system provides curated data to be used in an analytics zone, the curated data being generated by reconciling the input dataset with the baseline dataset.

17. The method of claim 11, further comprising:
generating logging statements for each database pool;
using temporary tables to store the logging statements; and
combining the logging statements.

18. The method of claim 11, wherein the baseline dataset comprises data from an access management input and the input dataset comprises data from the data management system that has been copied for processing independent of operations of an enterprise system.

19. A non-transitory computer readable medium comprising computer-executable instructions for reconciling data used by a data management system, the computer readable medium being executed by a processor of a computer system comprising a data interface, and comprising instructions for:

obtaining an input dataset, the input dataset being replicated from a baseline dataset to enable the data management system to operate on the input dataset;

determining a plurality of database pools, each associated with activities that can run independent from one another;

automatically reconciling the input dataset with the baseline dataset on a periodic basis using the plurality of database pools by executing logic to:

concurrently process data assigned to each of the plurality of database pools by checking the input dataset for discrepancies with the baseline dataset, wherein each database pool is processed on a separate thread of a multi-thread execution performed by the processor;

immediately and without waiting for all of the database pools to have finished processing, independently and concurrently execute statements, via the multi-thread execution, for any of the database pools that have finished processing; and create a delta table for each database pool to identify extracted data associated with the discrepancies between the input and baseline datasets; and combining delta tables from the plurality of database pools into a combined delta table and process columns associated with the combined delta table to execute an update based on any changes.

20. The method of claim 11, wherein the data management system provides a workspace for machine learning.

* * * * *